(12) United States Patent
Kurematsu (10) Patent No.: US 10,024,401 B2
(45) Date of Patent: Jul. 17, 2018

(54) CHAIN TENSIONER

(71) Applicant: TSUBAKIMOTO CHAIN CO., Osaka-shi, Osaka (JP)

(72) Inventor: Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 187 days.

(21) Appl. No.: 14/970,910

(22) Filed: Dec. 16, 2015

(65) Prior Publication Data

US 2016/0186838 A1 Jun. 30, 2016

(30) Foreign Application Priority Data

Dec. 24, 2014 (JP) ................................. 2014-260802

(51) Int. Cl.
*F16H 7/08* (2006.01)

(52) U.S. Cl.
CPC ....... *F16H 7/08* (2013.01); *F16H 2007/0806* (2013.01); *F16H 2007/0812* (2013.01); *F16H 2007/0853* (2013.01); *F16H 2007/0859* (2013.01)

(58) Field of Classification Search
CPC .............. F16H 7/08; F16H 2007/0806; F16H 2007/0812; F16H 2007/0853; F16H 2007/0859
USPC ....................................................... 474/110
See application file for complete search history.

(56) References Cited

U.S. PATENT DOCUMENTS

| 4,792,322 | A |   | 12/1988 | Goppelt et al. |
| 5,967,920 | A | * | 10/1999 | Dembosky ............... F01L 1/02 474/109 |
| 5,967,921 | A | * | 10/1999 | Simpson .................. F16H 7/08 474/110 |
| 6,866,601 | B2 | * | 3/2005 | Saitoh ................... F16H 7/0836 474/109 |
| 7,775,923 | B2 | * | 8/2010 | Sato ...................... F16H 7/0836 474/109 |

(Continued)

FOREIGN PATENT DOCUMENTS

| CN | 101334096 A | 12/2008 |
| CN | 102128240 A | 7/2011 |

(Continued)

*Primary Examiner* — William E Dondero
*Assistant Examiner* — Mark K Buse
(74) *Attorney, Agent, or Firm* — Westerman, Hattori, Daniels & Adrian, LLP (57) ABSTRACT

An object of the present invention is to provide a chain tensioner that allows a necessary and sufficient amount of oil to be fed during restart following a long stoppage of oil feeding and that maintains a proper pressure, thus preventing possible noise and vibration. An oil storing chamber 123 is formed inside a plunger 120 and forward of a check valve 150 in a protruding direction of the plunger 120. A tensioner body 110 has an oil feeding hole 114 through which a cylindrical surface portion 113 of a plunger housing hole 111 communicates with an outside and a high-pressure discharge hole 115 through which a pressure oil chamber 101 in the plunger housing hole 111 communicates with the outside. A relief valve 160 that is opened under a high pressure is provided in the high-pressure discharge hole 115 and closer to the pressure oil chamber 101.

5 Claims, 7 Drawing Sheets

(56) References Cited

U.S. PATENT DOCUMENTS

| | | | | |
|---|---|---|---|---|
| 2002/0052259 A1* | 5/2002 | Nakakubo | ............. | F16H 7/0848 474/109 |
| 2003/0134703 A1* | 7/2003 | Saitoh | ................... | F16H 7/0836 474/109 |
| 2006/0003859 A1* | 1/2006 | Sato | ...................... | F16H 7/0836 474/110 |
| 2006/0089221 A1* | 4/2006 | Hashimoto | ............... | F01L 1/02 474/110 |
| 2008/0318717 A1 | 12/2008 | Kurematsu | | |
| 2010/0093474 A1* | 4/2010 | Onimaru | ............... | F16H 7/0848 474/110 |
| 2010/0298078 A1* | 11/2010 | Hirayama | ................ | F01L 1/02 474/110 |
| 2014/0100068 A1* | 4/2014 | Kurematsu | ............... | F16H 7/08 474/110 |
| 2015/0292602 A1* | 10/2015 | Kurematsu | ............... | F16H 7/08 474/110 |

FOREIGN PATENT DOCUMENTS

| | | |
|---|---|---|
| CN | 103925348 A | 7/2014 |
| GB | 2 308 420 A | 6/1997 |
| JP | H09-177907 A | 7/1997 |
| JP | 2002-130401 A | 5/2002 |
| JP | 2002-235818 A | 8/2002 |
| JP | 2006-125430 A | 5/2006 |
| JP | 2006-144886 A | 6/2006 |
| JP | 2008-157382 A | 7/2008 |

\* cited by examiner

Related Art

CHAIN TENSIONER

BACKGROUND OF THE INVENTION

1. Field of the Invention

The present invention relates to a chain tensioner including a tensioner body having a cylindrical plunger housing hole that is open at one end, a cylindrical plunger slidably inserted into the plunger housing hole, and bias means housed, in an extensible manner, in a pressure oil chamber formed between the plunger housing hole and a rear end of a plunger, to bias the plunger in a protruding direction, the chain tensioner allowing tension of a chain to be properly maintained.

2. Description of the Related Art

A chain tensioner is conventionally commonly used to properly maintain the tension of a chain. For example, a chain guide mechanism is well known in which a traveling guide shoe is used to slidably guide a transmission chain such as a roller chain endlessly passed between sprockets provided on a crank shaft and a cam shaft in an engine room and in which a chain tensioner is used to bias a rocking chain guide with the traveling guide shoe in order to properly maintain tension.

Figure 10:
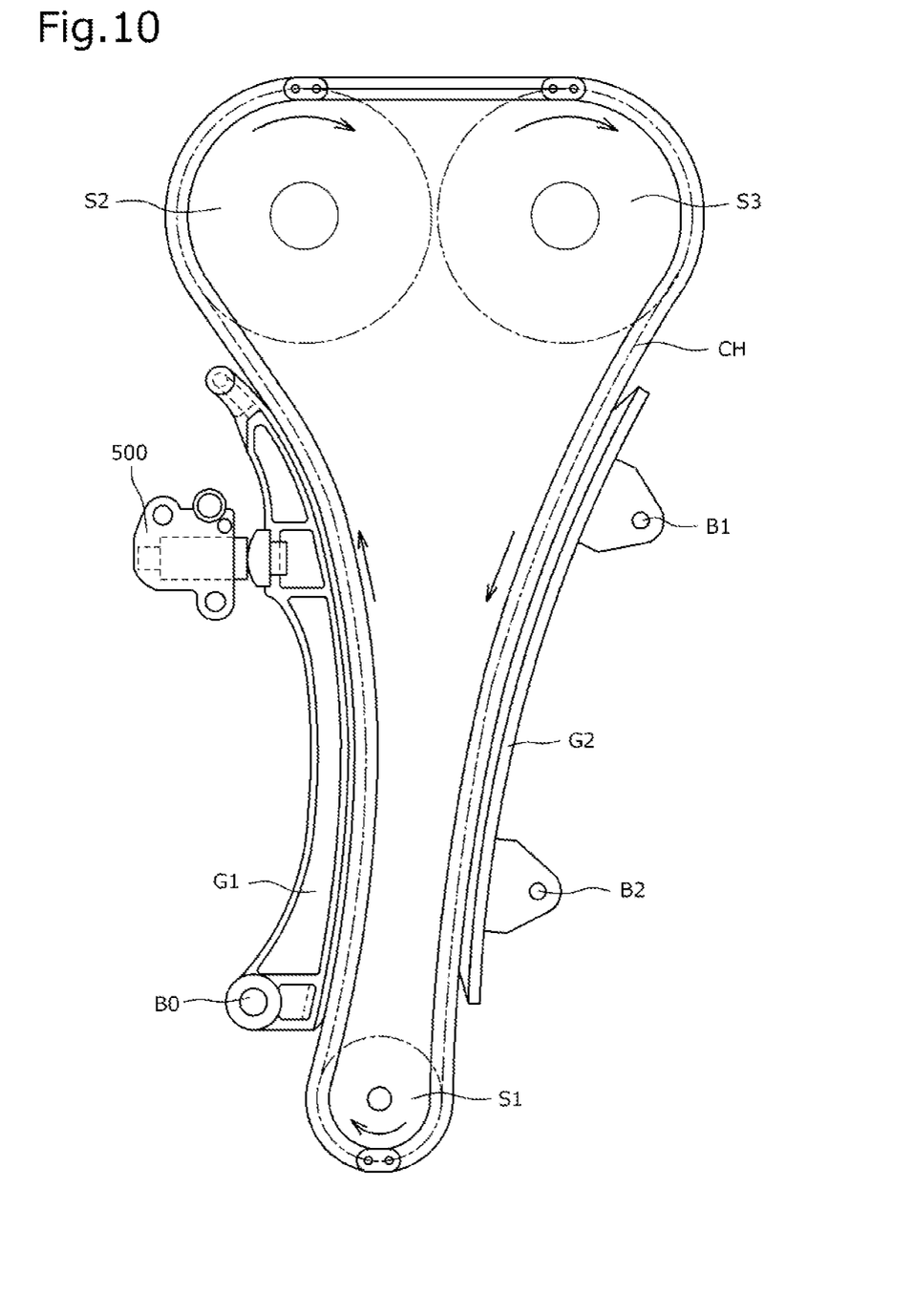
FIG. 10 is a diagram illustrating a chain tensioner used for a chain guide mechanism in the engine.

For example, a chain guide mechanism is configured such that a timing chain CH is endlessly passed between a driving sprocket S1 attached to a crank shaft in the engine room and a pair of driven sprockets S2 and S3 attached to a cam shaft in the engine room and such that the timing chain CH is guided by a rocking chain guide G1 and a fixed chain guide G2, as depicted in FIG. 10.

The fixed chain guide G2 is fixed in the engine room using two attachment shafts B1 and B2. The rocking chain guide G1 is attached to the inside of the engine room so as to be able to rock, being centered on an attachment shaft B0, in a passage plane for the timing chain CH.

A chain tensioner 500 presses the rocking chain guide G1 to properly maintain the tension of the timing chain CH while suppressing vibration.

Figure 11:
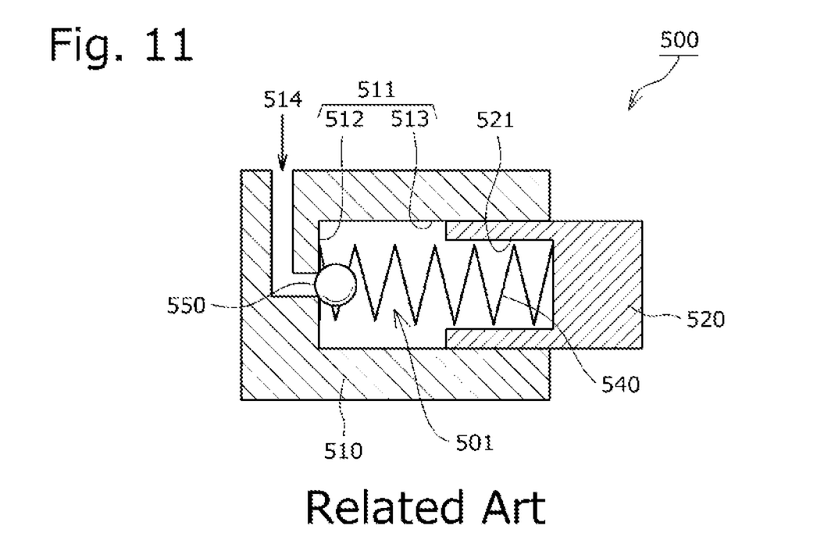
FIG. 11 is a schematic diagram illustrating a conventional chain tensioner.

The well-known tensioner 500 used for such a chain guide mechanism includes a tensioner body 510 having a cylindrical plunger-housing hole 511 that is open at one end, a cylindrical plunger 520 slidably inserted into a cylindrical surface portion 513 of the plunger housing hole 511, and bias means for biasing the plunger 520 in a protruding direction through the plunger housing hole 511, for example, as schematically depicted in FIG. 11.

The bias means includes a coil spring 540 that is housed in a tubular recess portion 521 of the cylindrical plunger 520 and that is compressed between the tubular recess portion 521 and a bottom portion 512 of the plunger housing hole 511.

Oil is fed through an oil feeding hole 514 formed in the plunger housing hole 511 to fill a pressure oil chamber 501 formed between the plunger housing hole 511 and the plunger 520. The oil causes the plunger 520 to be biased in the protruding direction, while a check valve 550 (the check valve 550 is schematically illustrated by depicting only a check ball) is used to inhibit outflow of the oil through the oil feeding hole 514.

Thus, as the plunger 520 makes reciprocating motion, the oil flows through a small gap between the plunger 520 and the plunger housing hole 511. The resultant channel resistance produces a damping effect that dampens the reciprocating motion of the plunger 520.

In the well-known chain tensioner, if an excessive tensile force is generated in the timing chain during use, the pressure in the pressure oil chamber becomes excessively high, possibly leading to noise, vibration, or damage to the timing chain.

For preventing the occurrence of such problem, a chain tensioner is well known which includes a relief valve that is opened when the pressure in the pressure oil chamber reaches a predetermined value or larger (see Japanese Patent Application Laid-open No. 2002-130401, 2002-235818, 2006-125430, or the like).

However, when the chain tensioners well known from Japanese Patent Application Laid-open Nos. 2002-130401, 2002-235818, 2006-125430, and the like, are left for a long time after stoppage of oil feeding, air is mixed into the pressure oil chamber, leading to an insufficient holding force at the time of startup.

Moreover, immediately after the startup, the feeding of the oil suffers a time lag, and thus, the oil in the pressure oil chamber only leaks and no new oil is fed, in spite of the reciprocating motion of the plunger. The oil in the pressure oil chamber decreases to prevent the damping force of the oil from acting on the plunger. Disadvantageously, the timing chain may vibrate significantly to produce an abnormal sound or may be damaged.

SUMMARY OF THE INVENTION

The present invention solves these problems. An object of the present invention is to provide a chain tensioner that allows a necessary and sufficient amount of oil to foe fed during restart following a long stoppage of oil feeding and that maintains a proper pressure even if an excessive tensile force is generated, thus preventing possible noise and vibration and possible damage to a timing chain.

Aspects of the present invention provide a chain tensioner including a tensioner body having a cylindrical plunger housing hole that is open at one end, a cylindrical plunger slidably inserted into the plunger housing hole, and bias means housed, in an extensible manner, in a pressure oil chamber formed between the plunger housing hole and a rear end of a plunger, to bias the plunger in a protruding direction. The chain tensioner accomplishes the above-described object using the following configuration. The plunger has a plunger main body and a check valve provided inside the plunger main body. An oil storing chamber is formed inside the plunger main body and forward of the check valve in the protruding direction. The tensioner body has an oil feeding hole through which a cylindrical surface portion of the plunger housing hole communicates with an outside and a high-pressure discharge hole through which the pressure oil chamber in the plunger housing hole communicates with the outside. A relief valve that is opened under a high pressure is provided in the high-pressure discharge hole and closer to the pressure oil chamber.

In the chain tensioner in a first aspect, the plunger has the plunger main body and the check valve provided inside the plunger main body, and the oil storing chamber is formed inside the plunger main body and forward of the check valve in the protruding direction. Thus, the chain tensioner uses the simple configuration to enable a necessary and sufficient amount of oil to be fed during restart following a long stoppage of oil feeding and to enable mixture of air into the pressure oil chamber to be prevented. Consequently, a sufficient holding force and a sufficient damping force can be exerted even during restart, allowing prevention of possible noise and vibration and possible damage to the timing chain.

The tensioner body has the high-pressure discharge hole through which the pressure oil chamber in the plunger housing hole communicates with the outside, and the relief valve that is opened under a high pressure is provided in the high-pressure discharge hole and closer to the pressure oil chamber. Thus, if an excessive tensile force is generated, the pressure is released to allow prevention of possible noise and vibration and possible damage to the timing chain.

In a configuration in a second aspect, an external opening of the oil feeding hole and an external opening of the high-pressure discharge hole are formed in an attachment surface of the tensioner body, and the external opening of the oil feeding hole and the external opening of the high-pressure discharge hole are formed such that the external openings face an oil feeding space that communicates with the oil discharge port. Consequently, the oil flowing out when the relief valve is opened returns to the oil feeding space, enabling a reduction in the outflow of the oil to an outside of the chain tensioner.

Thus, for example, for a timing system for an engine, a load on an oil pump can be reduced to enable a decrease in engine efficiency to be suppressed.

Furthermore, the oil fed from the oil pump applies a certain level of pressure to the oil feeding space, suppressing a decrease in the pressure in the pressure oil chamber when the relief valve is opened. This enables insufficiency of a holding force to foe restrained, allowing possible noise and vibration to be inhibited.

In a configuration in a third aspect, the oil feeding space communicating with the oil discharge port has a flow rate limiting portion between the oil feeding hole and the high-pressure discharge hole. This enables a reduction in the amount of oil flowing out from the pressure oil chamber when the relief valve is opened, allowing further suppression of a decrease in the pressure in the pressure oil chamber.

In a configuration in a fourth aspect, the relief valve is provided at a bottom portion of the plunger housing hole. Thus, the high-pressure discharge hole can foe easily processed, facilitating assembly of the relief valve.

The relief valve also prevents a substantial decrease in the volumes of the oil storing chamber and the pressure oil chamber and limitation of stroke of the plunger.

In a configuration in a fifth aspect, the oil feeding hole is formed to be located above a plunger supply hole when the tensioner body is attached such that the plunger protrudes upward with respect to a horizontal plane. Thus, an increased amount of oil remains in the oil storing chamber before restart, allowing a more sufficient holding force and a more sufficient damping force to be exerted during restart.

DESCRIPTION OF THE PREFERRED EMBODIMENTS

A chain tensioner in the present invention includes a tensioner body having a cylindrical plunger housing hole that is open at one end, a cylindrical plunger slidably inserted into the plunger housing hole, and bias means housed, in an extensible manner, in a pressure oil chamber formed between the plunger housing hole and a rear end of a plunger, to bias the plunger in a protruding direction. The plunger has a plunger main body and a check valve provided inside the plunger main body. An oil storing chamber is formed inside the plunger main body and forward of the check valve in the protruding direction. The tensioner body has an oil feeding hole through which a cylindrical surface portion of the plunger housing hole communicates with an outside and a high-pressure discharge hole through which the pressure oil chamber in the plunger housing hole communicates with the outside. A relief valve that is opened under a high pressure is provided in the high-pressure discharge hole and closer to the pressure oil chamber. The chain tensioner allows a necessary and sufficient amount of oil to be fed during restart following a long stoppage of oil feeding and maintains a proper pressure even if an excessive tensile force is generated, thus preventing possible noise and vibration and possible damage to a timing chain. The chain tensioner may have any specific configuration as long as the above-described basic configuration and effects are achieved.

Embodiment 1

A chain tensioner 100 according to a first embodiment of the present invention will be described based on the drawings. As depicted in FIGS. 1 to 4B, the chain tensioner 100 according to the first embodiment of the present invention includes a tensioner body 110 having a cylindrical plunger housing hole 111 that is open at one end, a cylindrical plunger 120 slidably inserted into the plunger housing hole 111, and a coil spring 140 housed, in an extensible manner, in a pressure oil chamber 101 formed between the plunger housing hole and a rear end of a plunger 120, to bias the plunger 120 in a protruding direction.

The plunger 120 has a plunger main body 126 and a check valve 150 provided inside the plunger main body 126.

Figure 4A:
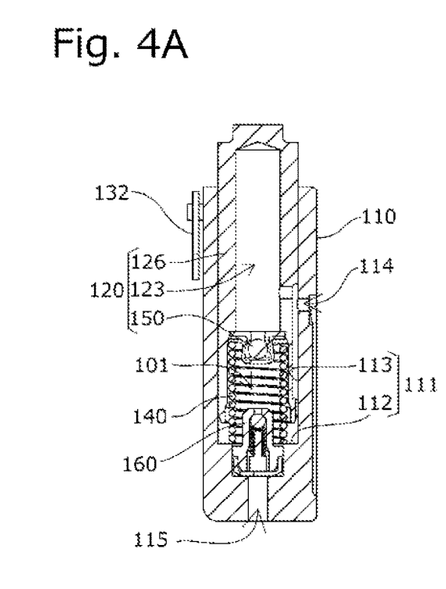
FIG. 4A includes sectional views of the chain tensioner of FIG. 1 taken along line I-I of FIG. 2A.
Figure 4B:
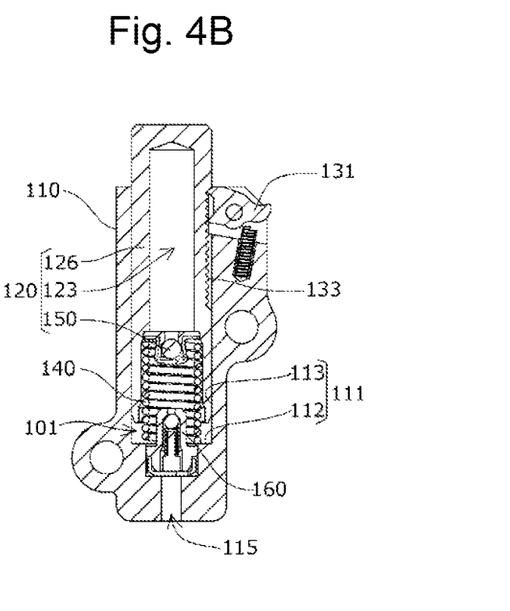
FIG. 4B includes sectional views of the chain tensioner of FIG. 1 taken along line II-II of FIG. 2B.
Figure 5:
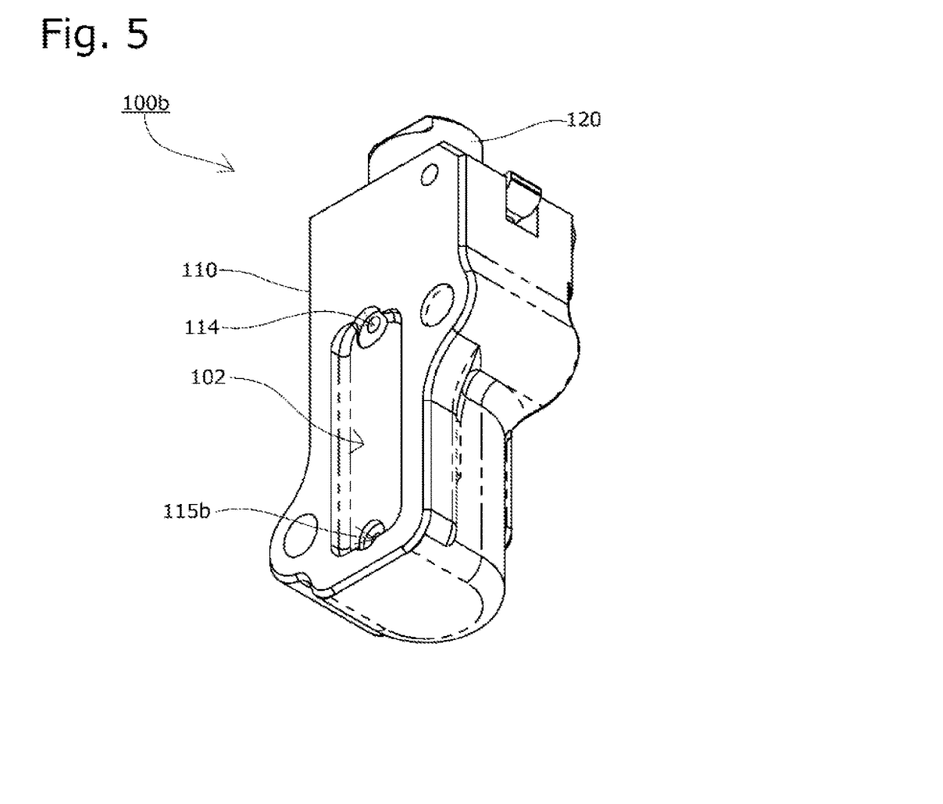
FIG. 5 is a perspective view of a chain tensioner according to a second embodiment of the present invention.
Figure 6:
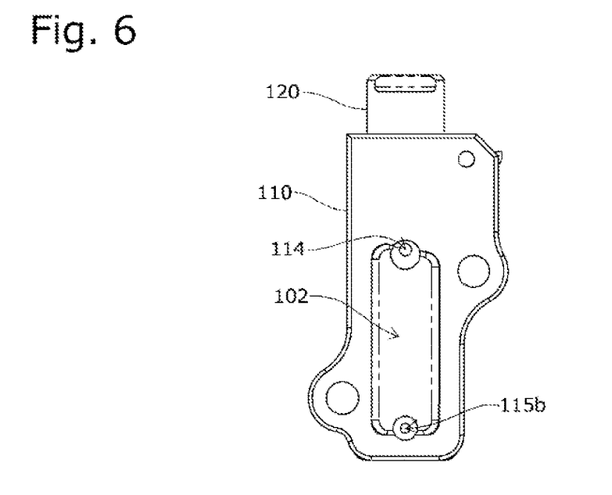
FIG. 6 is a rear view (attachment surface) of the chain tensioner in FIG. 5.
Figure 7A:
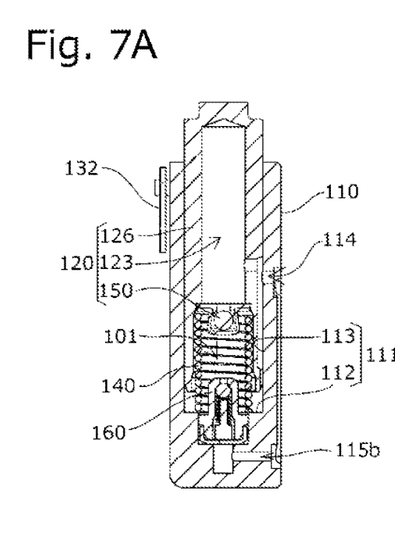
FIG. 7A includes a sectional view of the chain tensioner in FIG. 5 taken along a line corresponding to line I-I of FIG. 2A.
Figure 7B:
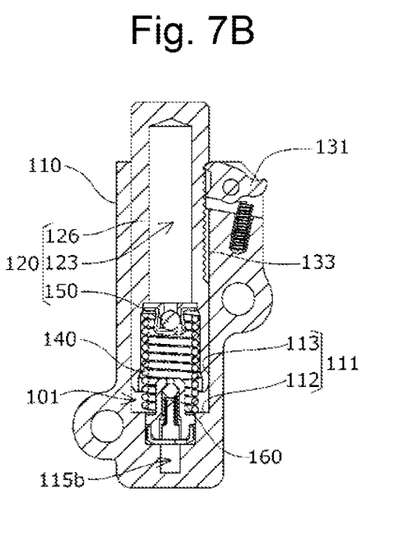
FIG. 7B includes a sectional view of the chain tensioner in FIG. 5 taken along a line corresponding to line II-II of FIG. 2B.

The check valve 150 is arranged inside the plunger main body 126, and an oil storing chamber 123 is formed forward of the check valve 150 in a protruding direction of plunger.

The coil spring 140 is provided which is housed in the pressure oil chamber 101 in an extensible manner to bias the plunger 120 in the protruding direction.

The tensioner body 110 has an oil feeding hole 114 through which a cylindrical surface portion 113 of the plunger housing hole 111 communicates with the outside and a high-pressure discharge hole 115 through which a bottom portion 112 of the plunger housing hole 111 communicates with the outside. A relief valve 160 that is opened under a high pressure is provided in the high-pressure discharge hole 115 and closer to the pressure oil chamber 101.

The tensioner body 110 is fixed to a wall surface inside an engine for use. The oil feeding hole 114 is formed to face the wall surface. The high-pressure discharge hole 115 is formed to extend linearly downward.

Figure 1:
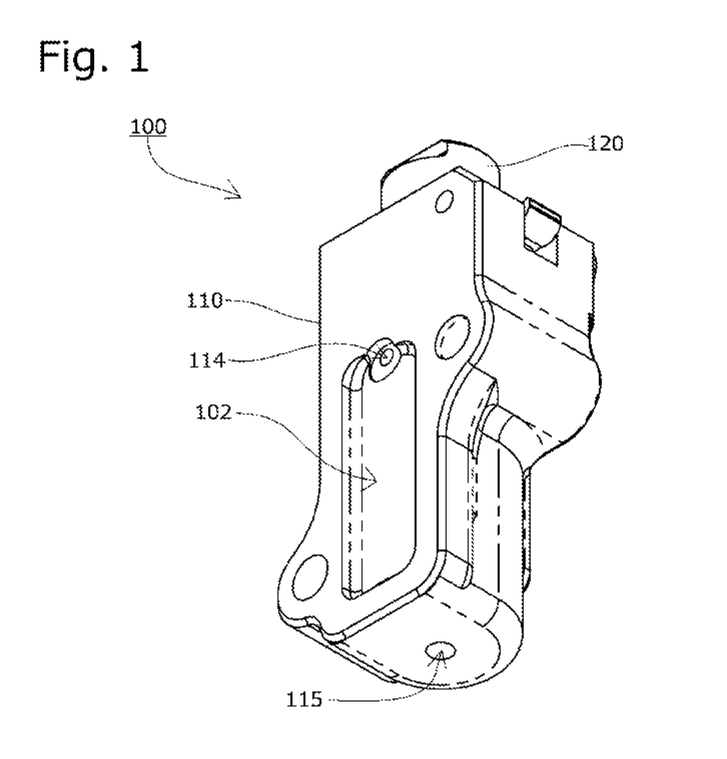
FIG. 1 is a perspective view of a chain tensioner according to a first embodiment of the present invention.
Figure 2A:
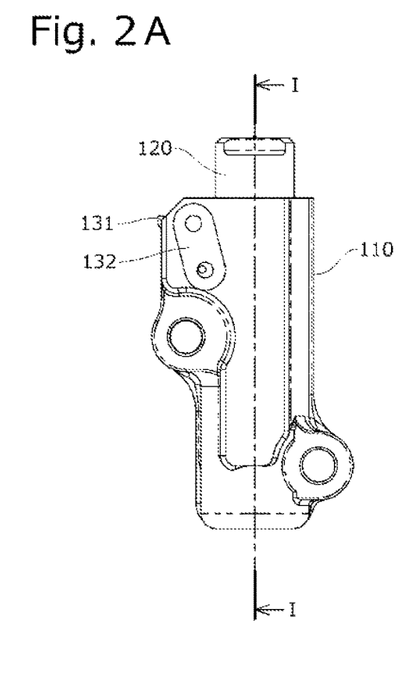
FIG. 2A includes a front view of the chain tensioner of FIG. 1.
Figure 2B:
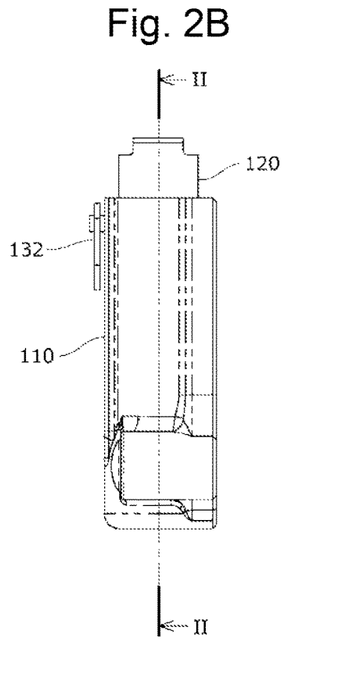
FIG. 2B includes a right side view of the chain tensioner of FIG. 1.
Figure 3A:
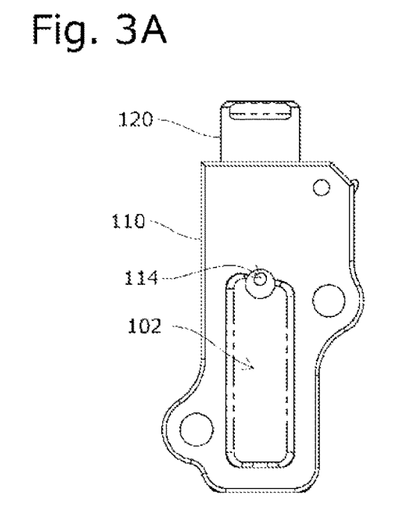
FIG. 3A includes a rear view (attachment surface) of the chain tensioner of FIG. 1.
Figure 3B:
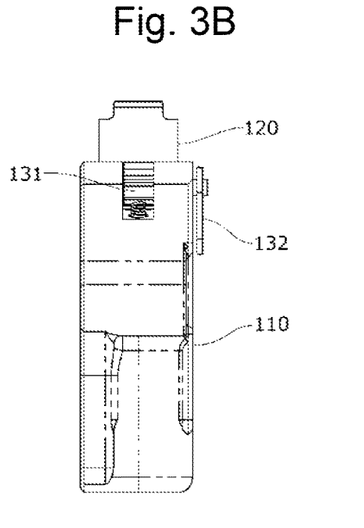
FIG. 3B includes a left side view of the chain tensioner of FIG. 1.

The chain tensioner 100 according to the present embodiment is what is called a ratchet tensioner. A ratchet portion 133 is formed on an outer peripheral surface of the plunger main body 126. The ratchet portion 133 engages with a ratchet pawl 131 provided on the tensioner body 110 so as to be able to rock, thus regulating protruding and retracting movement of the plunger 120.

A pawl fixing lever 132 is provided which regulates rocking of the ratchet pawl 131 during assembly or maintenance.

Operations of the chain tensioner 100 according to the first embodiment of the present invention configured as described above will be described.

When the stopped engine is started, no oil is fed, and the engine operates using only the oil remaining in the pressure oil chamber 101 and the oil storing chamber 123.

When the plunger 120 protrudes, the oil in the oil storing chamber 123 flows to the pressure oil chamber 101 through the check valve 150. When the plunger 120 is pushed in, the oil in the pressure oil chamber 101 leaks along an outer periphery of the plunger 120 and returns into the oil storing chamber 123.

During normal operation, the plunger 120 in the chain tensioner 100 protrudes according to the number of rotations and reciprocates under the vibration of the chain.

The oil fed through the oil feeding hole in the wall surface flows through an oil feeding space 102 and the oil feeding hole 114 and is introduced into the plunger housing hole 111. The oil is then fed into the oil storing chamber 123 inside the plunger main body 126.

In conjunction with reciprocating motion of the plunger 120, the oil in the oil storing chamber 123 flows to the pressure oil chamber 101 through the check valve 150 when the plunger 120 protrudes. The oil serves to maintain the pressure oil chamber 101 at a predetermined pressure when the plunger 120 is pushed in.

When an excessive tensile force is generated on a timing chain as a result of a high-speed or -load operation, the relief valve 160 is opened to discharge the oil in the pressure oil chamber 101 through the high-pressure discharge hole 115. Thus, the excessive pressure is released to prevent possible noise and vibration and possible damage to the timing chain.

In the present embodiment, a recess portion is formed in the tensioner body 110 so as to serve as the oil feeding space 102 when the tensioner body 110 is attached to the wall surface. However, a recess portion may also be formed in the wall surface to serve as an oil feeding space, or instead of forming the recess portion in the tensioner body 110, it is also preferable to place the oil feeding hole 114 directly opposite to an oil discharge port in the wall surface to omit the oil feeding space.

Alternatively, instead of forming the recess portion in the tensioner body 110, it is also preferable to form a recess portion only in the wall surface to define an oil feeding space.

Embodiment 2

In a chain tensioner 100b according to a second embodiment of the present invention, an external opening of a high-pressure discharge hole 115b is directed toward the oil feeding space 102 in an attachment surface of the tensioner body 110 as depicted in FIGS. 5 to 8. The remaining part of the configuration is the same as the corresponding part of the configuration of the chain tensioner 100 according to the above-described first embodiment (the same members and structures are denoted by the same reference numerals).

Figure 8:
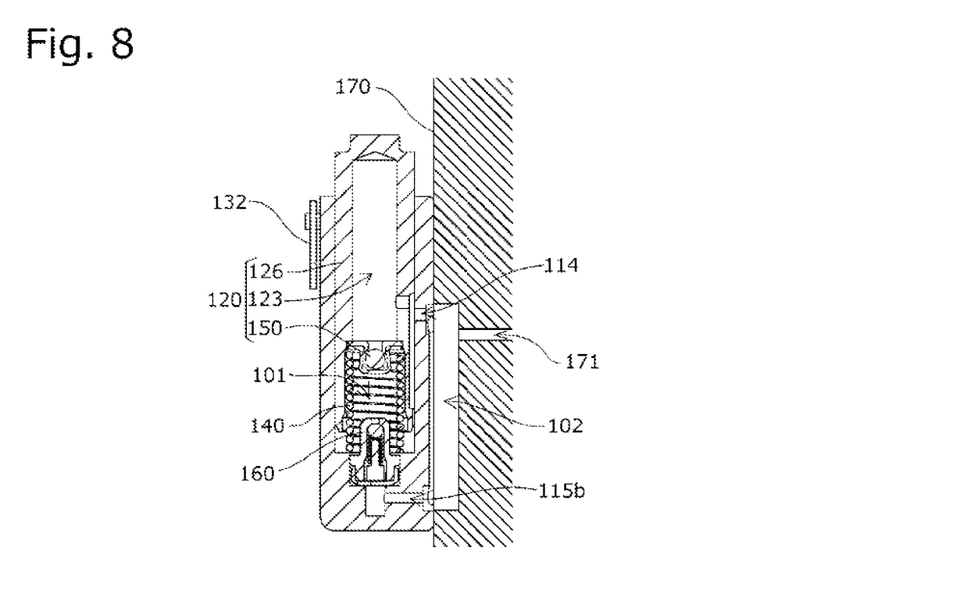
FIG. 8 is a sectional view illustrating that the chain tensioner in FIG. 5 is attached to a wall surface inside an engine.

As depicted in FIG. 8, a recess portion forming the oil feeding space 102 is also formed in a wall surface 170 to which the chain tensioner 100b is attached. Oil is fed through an oil discharge port 171 toward the oil feeding space 102.

Operations of the chain tensioner 100b according to the present embodiment are similar to the operations of the chain tensioner 100 according to the above-described first embodiment, and produce effects similar to the effects of the operations of the chain tensioner 100.

A high-pressure discharge hole 115b is open toward the oil feeding space 102. Thus, when an excessive tensile force is generated on the timing chain, whereby the relief valve 160 is opened to discharge the oil in the pressure oil chamber 101 through the high-pressure discharge hole 115b, the oil returns to the oil feeding space 102 to reduce the outflow of oil to an outside of the chain tensioner 100b. This in turn reduces a load on an oil pump to enable a decrease in engine efficiency to be suppressed.

Oil fed from the oil pump applies a certain level of pressure to the oil feeding space 102, suppressing a decrease in the pressure in the pressure oil chamber 101 when the relief valve 160 is opened. This enables insufficiency of a holding force to be restrained, allowing possible noise and vibration to be inhibited.

In the chain tensioner 100b according to the present embodiment, instead of forming a recess portion in the tensioner body 110, it is also preferable to form a recess portion only in the wall surface to define the oil feeding space 102, as is the case with the chain tensioner 100 according to the above-described first embodiment.

Embodiment 3

Figure 9A:
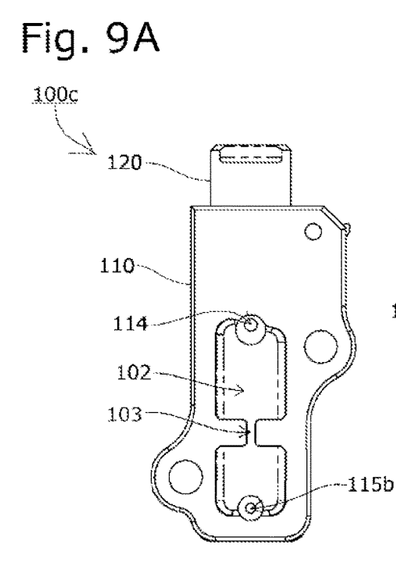
FIG. 9A includes a rear view of a chain tensioner according to a third embodiment.
Figure 9B:
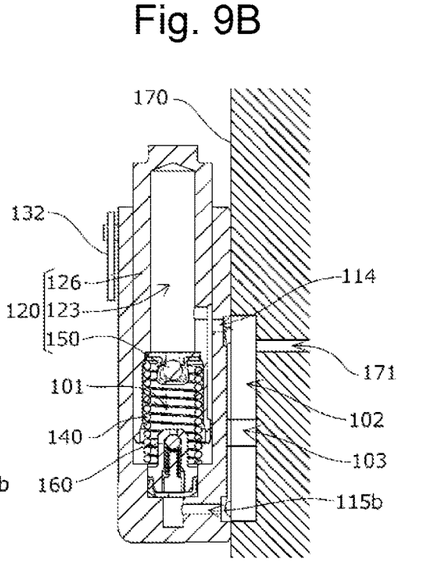
FIG. 9B includes a sectional view illustrating that the chain tensioner is attached to the wall surface inside the engine.

In a chain tensioner 100c according to a third embodiment, the oil feeding space 102 communicating with the oil discharge port 171 has a flow rate limiting portion 103 between the oil feeding hole 114 and the high-pressure discharge hole 115b as depicted in FIGS. 9A and 9B. The remaining part of the configuration is the same as the corresponding part of the configuration of the chain tensioner 100b according to the above-described second embodiment (the same members and structures are denoted by the same reference numerals).

In the chain tensioner 100c according to the present embodiment, the flow rate limiting portion 103 is provided between the oil feeding hole 114 and the high-pressure discharge hole 115b. This enables a reduction in the amount of oil flowing out from the pressure oil chamber when the relief valve 160 is opened, allowing further suppression of a decrease in the pressure in the pressure oil chamber 101.

The flow rate limiting portion 103 is not limited to the illustrated flow rate limiting portion 103 but may have any shape.

The above-described embodiments and variations are specific examples of the chain tensioner according to the present invention. However, the chain tensioner according to the present invention is not limited to the embodiments and variations. Many variations may be made to the shapes, positions, dimensions, arrangement relations, and the like of the components, and the variations may be combined as needed.

For example, the ratchet mechanisms in the embodiments may have different structures or omitted. A component assembled into the chain tensioner may foe added to the ratchet mechanism.

The chain tensioner of the present invention is not limited to the chain tensioner applied to s chain guide mechanism in which a traveling guide shoe is used to slidably guide a transmission chain such as a roller chain endlessly passed between sprockets provided on a crank shaft and a cam shaft in an engine room. The chain may be directly slidably guided using the tip of the plunger.

The chain tensioner of the present invention may foe applied not only to the chain-based transmission mechanism but to similar transmission mechanisms such as a belt and a rope. The chain tensioner of the present invention can be utilized in various industrial fields for any applications that need to allow oil to exert a pressing force or to feed a sufficient amount of oil during restart following a long stoppage of oil feeding.

What is claimed is:

1. A chain tensioner, comprising:
   a tensioner body having a cylindrical plunger housing hole that is open at one end;
   a cylindrical plunger slidably inserted into the plunger housing hole; and
   bias means housed, in an extensible manner, in a pressure oil chamber formed between the plunger housing hole and a rear end of a plunger, to bias the plunger in a protruding direction,
   wherein the plunger has a plunger main body and a check valve provided inside the plunger main body,
   wherein an oil storing chamber is formed inside the plunger main body and forward of the check valve in the protruding direction,
   wherein the tensioner body has an oil feeding hole through which a cylindrical surface portion of the plunger housing hole communicates with an outside of the chain tensioner and a high-pressure discharge hole through which the pressure oil chamber in the plunger housing hole communicates with the outside of the chain tensioner, and
   wherein a relief valve that is provided in the high-pressure discharge hole at a location which is closer to the pressure oil chamber than an opening of the high-pressure discharge hole.

2. The chain tensioner according to claim 1, wherein an external opening of the oil feeding hole and an external opening of the high-pressure discharge hole are formed in an attachment surface of the tensioner body, and
   the external opening of the oil feeding hole and the external opening of the high-pressure discharge hole are formed such that, when the tensioner body is attached to a wall surface provided with an oil discharge port, the external openings face an oil feeding space that communicates with the oil discharge port.

3. The chain tensioner according to claim 2, wherein the oil feeding space communicating with the oil discharge port has a flow rate limiting portion between the oil feeding hole and the high-pressure discharge hole.

4. The chain tensioner according to claim 1, wherein the relief valve is provided at a bottom portion of the plunger housing hole.

5. The chain tensioner according to claim 1, wherein a plunger supply hole, through which the oil storing chamber in the plunger main body communicates with an outer periphery, is formed, and the oil feeding hole is formed to be located above the plunger supply hole when the tensioner body is attached such that the plunger protrudes upward with respect to a horizontal plane.

\* \* \* \* \*